United States Patent
Youki et al.

(10) Patent No.: US 10,908,322 B2
(45) Date of Patent: Feb. 2, 2021

(54) ANTISTATIC HARDCOAT FILM, PROCESS FOR PRODUCING SAME, POLARIZER, AND IMAGE DISPLAY DEVICE

(75) Inventors: Mayu Youki, Tokyo (JP); Tomoyuki Horio, Tokyo (JP); Yoshihiro Nishimura, Tokyo (JP); Mariko Hayashi, Tokyo (JP); Yuya Inomata, Tokyo (JP); Hiroshi Nakamura, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 1002 days.

(21) Appl. No.: 13/823,971

(22) PCT Filed: Sep. 6, 2011

(86) PCT No.: PCT/JP2011/070262
§ 371 (c)(1),
(2), (4) Date: Jun. 14, 2013

(87) PCT Pub. No.: WO2012/039279
PCT Pub. Date: Mar. 29, 2012

(65) Prior Publication Data
US 2013/0271832 A1    Oct. 17, 2013

(30) Foreign Application Priority Data
Sep. 21, 2010    (JP) .................. 2010-211145

(51) Int. Cl.
*G02B 1/14* (2015.01)
*G02B 1/16* (2015.01)
(Continued)

(52) U.S. Cl.
CPC .............. *G02B 1/14* (2015.01); *G02B 1/10* (2013.01); *G02B 1/16* (2015.01); *G02B 1/18* (2015.01);
(Continued)

(58) Field of Classification Search
None
See application file for complete search history.

(56) References Cited

U.S. PATENT DOCUMENTS

2008/0204634 A1    8/2008    Horio
2009/0015926 A1*   1/2009    Iwata .................... G02B 1/105
                                                  359/601
(Continued)

FOREIGN PATENT DOCUMENTS

JP    2003-131007 A    5/2003
JP    2003-205563 A    7/2003
(Continued)

*Primary Examiner* — Elizabeth A Robinson
*Assistant Examiner* — Daniel D Lowrey
(74) *Attorney, Agent, or Firm* — Hamre, Schumann, Mueller & Larson, P.C.

(57) ABSTRACT

The claimed invention provides an antistatic hard coat film that is extremely excellent in white muddiness resistance and antistatic properties and sufficiently prevents an interference fringe pattern. The claimed invention provides an antistatic hard coat film including a triacetyl cellulose substrate and a hard coat layer formed on the triacetyl cellulose substrate, the hard coat layer including an antistatic agent, a (meth)acrylate resin, and a polymer of a (meth)acrylate
(Continued)

monomer, the triacetyl cellulose substrate including a permeation layer formed by permeation of the (meth)acrylate monomer from the hard coat layer side of the interface toward the opposite side of the hard coat layer, the antistatic hard coat film satisfying Formulas (1), (2), and (3):

$$3 \ \mu m \leq T \leq 18 \ \mu m \quad \text{Formula (1)}$$

$$0.3T \leq t \leq 0.9T \quad \text{Formula (2)}$$

$$2 \ \mu m \leq T-t \leq 11 \ \mu m \quad \text{Formula (3)}$$

where T denotes the total thickness (μm) of the permeation layer and the hard coat layer, and t denotes the thickness (μm) of the permeation layer.

15 Claims, 1 Drawing Sheet

(51) Int. Cl.
  *G02B 1/18* (2015.01)
  *G02B 1/10* (2015.01)
  G02B 5/30 (2006.01)
  G02B 27/00 (2006.01)

(52) U.S. Cl.
  CPC ........ *G02B 5/3033* (2013.01); *G02B 27/0006* (2013.01); *Y10T 428/24975* (2015.01)

(56) References Cited

U.S. PATENT DOCUMENTS

| | | | |
|---|---|---|---|
| 2009/0075074 | A1 | 3/2009 | Horio et al. |
| 2010/0027117 | A1* | 2/2010 | Suzuki .................. G02B 1/105 359/489.2 |
| 2010/0208350 | A1* | 8/2010 | Yoshihara ............... G02B 1/12 359/585 |

FOREIGN PATENT DOCUMENTS

| | | |
|---|---|---|
| JP | 2006-035493 | 2/2006 |
| JP | 2008-012675 A | 1/2008 |
| JP | 2008-173856 A | 7/2008 |
| JP | 2009-086660 A | 4/2009 |
| JP | 2009-198545 A | 9/2009 |
| JP | 2010-060643 A | 3/2010 |
| JP | 2010-082860 A | 4/2010 |
| JP | 2010-085931 A | 4/2010 |
| TW | 200642837 | 3/1995 |
| TW | 200903018 A | 1/2009 |

\* cited by examiner

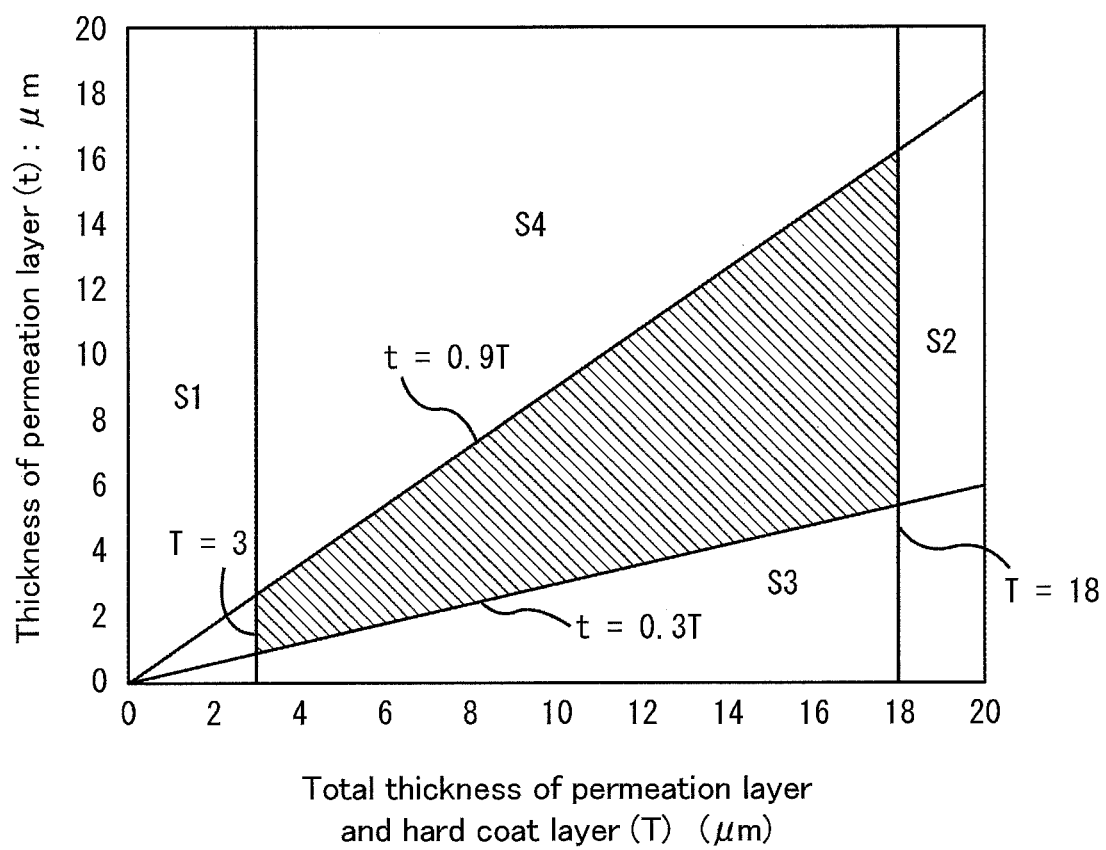

ANTISTATIC HARDCOAT FILM, PROCESS FOR PRODUCING SAME, POLARIZER, AND IMAGE DISPLAY DEVICE

CROSS REFERENCE TO RELATED APPLICATIONS

This application is a National Phase filing under 35 U.S.C. § 371 of PCT/JP2011/070262 filed on Sep. 6, 2011; and this application claims priority to Application No. 2010-211145 filed in Japan on Sep. 21, 2010 under 35 U.S.C. § 119; the entire contents of all are hereby incorporated by reference.

TECHNICAL FIELD

The claimed invention relates to an antistatic hard coat film, a method for producing the same, a polarizer, and an image display device.

BACKGROUND ART

Image display devices such as cathode ray tube (CRT) displays, liquid crystal displays (LCD), plasma display panels (PDP), electroluminescence displays (ELD), field emission displays (FED), touch panels, electronic paper displays, and tablet computers are generally provided with an optical layered body that contains layers having various functions such as anti-reflective properties, hard coating properties, and antistatic properties on the outermost surface.

An optical layered body is produced by stacking various functional layers on a transparent substrate. Accordingly, when a hard coat layer is formed on a transparent substrate, for example, interference occurs between the reflected light of the surface of the hard coat layer and the reflected light of the interface between the surface of the transparent substrate and the hard coat layer. Thereby, an uneven pattern called an interference fringe pattern appears due to an uneven thickness of a layer, which deteriorates the appearance.

Such an interference fringe pattern is known to be blocked, for example, by a solvent which permeates into a transparent substrate and swells or dissolves the substrate. Specifically, when a hard coat layer is formed on a transparent substrate, this solvent is used as a resin composition for forming the hard coat layer (refer to Patent Literatures 1 and 2, for example). Use of a resin composition including such a solvent enables to substantially eliminate the interface between the transparent substrate and the hard coat layer, whereby the occurrence of an interference fringe pattern can be blocked.

Additionally, Patent Literature 3 discloses an optical layered body, that includes a resin layer formed with a composition for forming a hard coat layer consisting of a specific quaternary ammonium salt, (meth)acrylate, and permeable solvent, formed on a light-transmitting substrate.

The optical layered body disclosed in Patent Literature 3 substantially eliminates the interface between the light-transmitting substrate and the resin layer, and blocks an interference fringe pattern. Moreover, the resin layer on the light-transmitting substrate is designed to give, in addition to hard coating properties, antistatic properties, white muddiness resistance, and optical characteristics such as light transmitting properties to some extent.

However, optical layered bodies are recently required much higher qualities as the quality of image display devices has been improved.

Conventional optical layered bodies as described have problems to sufficiently meet the high quality requirements of recent years. Examples of the problems are: if the white muddiness resistance is achieved at a high level, the antistatic properties are reduced and an interference fringe pattern appears; and in contrast, if the antistatic properties are achieved at a high level, the white muddiness resistance is reduced.

CITATION LIST

Patent Literature

Patent Literature 1: JP2003-131007 A
Patent Literature 2: JP2003-205563 A
Patent Literature 3: JP2009-086660 A

SUMMARY OF INVENTION

Technical Problem

In view of the above circumstances, the claimed invention aims to provide: an antistatic hard coat film that is extremely excellent in white muddiness resistance and antistatic properties, and sufficiently inhibits an interference fringe pattern; a polarizer including the antistatic hard coat film; and an image display device including the same.

Solution to Problem

The claimed invention provides An antistatic hard coat film comprising a triacetyl cellulose substrate, and a hard coat layer formed on the triacetyl cellulose substrate, wherein the hard coat layer comprises an antistatic agent, a (meth)acrylate resin, and a polymer of a (meth)acrylate monomer, the triacetyl cellulose substrate comprises a permeation layer formed by permeation of the (meth)acrylate monomer from the hard coat layer side of the interface toward the opposite side of the hard coat layer, the antistatic hard coat film satisfies Formulas (1), (2), and (3):

$$3\ \mu m \leq T \leq 18\ \mu m \quad \text{Formula (1)}$$

$$0.3T \leq t \leq 0.9T \quad \text{Formula (2)}$$

$$2\ \mu m \leq T-t \leq 11\ \mu m \quad \text{Formula (3)}$$

where T denotes the total thickness (μm) of the permeation layer and the hard coat layer, and t denotes the thickness (μm) of the permeation layer.

In the antistatic hard coat film of the claimed invention, the thickness of the permeation layer (t) is preferably 2 to 8 μm.

The hard coat layer is preferably a cured product of a composition for producing a hard coat layer containing the antistatic agent, the (meth)acrylate resin, and the (meth)acrylate monomer, applied on the triacetyl cellulose substrate. The permeation layer is preferably formed by permeation of the (meth)acrylate monomer in the composition for producing a hard coat layer into the triacetyl cellulose substrate.

The antistatic agent preferably contains a quaternary ammonium salt oligomer.

The (meth)acrylate monomer preferably has a weight-average molecular weight of less than 1,000.

The (meth)acrylate monomer is preferably at least one selected from the group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, and isocyanuric acid EO-modified tri(meth)acrylate.

The claimed invention also provides a polarizer comprising a polarizing element, wherein the polarizer comprises the antistatic hard coat film on the polarizing element surface.

The claimed invention still also provides an image display device comprising the antistatic hard coat film or the polarizer on an outermost surface thereof.

The claimed invention still further provides a method for producing an antistatic hard coat film that contains a triacetyl cellulose substrate and a hard coat layer formed on the triacetyl cellulose substrate, the method including: forming a film by applying a composition for producing a hard coat layer on the triacetyl cellulose substrate, the composition including an antistatic agent, a (meth)acrylate resin, and a (meth)acrylate monomer; drying the film under the drying conditions below within 20 seconds from completion of the application of the composition; and curing the dried film, the drying conditions being:

Drying temperature: 40 to 80° C.;
Drying time: 20 to 70 seconds; and
Wind velocity: 5 to 20 m/min.

The following will illustrate the claimed invention in detail.

The claimed invention is an antistatic hard coat film that includes a triacetyl cellulose substrate and a hard coat layer formed on the triacetyl cellulose substrate. The hard coat layer contains an antistatic agent and a (meth)acrylate resin. The triacetyl cellulose substrate contains a permeation layer with a specific thickness, that is formed by permeation of the (meth)acrylate monomer from the hard coat layer side of the interface to the inner region of the triacetyl cellulose substrate.

Conducting sensitive investigations on the antistatic hard coat film that includes the above components, the present inventors focused on the relationship between the thickness of the permeation layer and the total thickness of the permeation layer and the hard coat layer. Thereby, they found that if the relationship satisfies specific formulas, the white muddiness resistance and the antistatic properties improve to extremely excellent levels, and moreover, the occurrence of an interference fringe pattern can be sufficiently inhibited. The claimed invention was thus completed.

The antistatic hard coat film of the claimed invention includes a triacetyl cellulose substrate and a hard coat layer formed on the triacetyl cellulose substrate.

The triacetyl cellulose substrate has transparency and heat resistance, and moreover is excellent in optical performance.

The triacetyl cellulose substrate preferably has a thickness of 20 to 300 μm, and more preferably 30 to 200 μm.

In the antistatic hard coat film of the claimed invention, the triacetyl cellulose substrate has a permeation layer formed by permeation of a (meth)acrylate monomer from the later-described hard coat layer side of the interface toward the opposite side of the hard coat layer. If the antistatic hard coat film of the claimed invention has the permeation layer, the occurrence of an interference fringe pattern is appropriately inhibited.

The term (meth)acrylate herein indicates both methacrylate and acrylate.

The antistatic hard coat film of the claimed invention satisfies Formulas (1) and (2) below, wherein T denotes the total thickness (μm) of the permeation layer and the hard coat layer, and t denotes the thickness (μm) of the permeation layer. If all Formulas (1), (2), and (3) below are satisfied, the antistatic hard coat film of the claimed invention achieves the white muddiness resistance and the antistatic properties at extremely high levels.

$$3 \text{ μm} \leq T \leq 18 \text{ μm} \quad \text{Formula (1)}$$

$$0.3T \leq t \leq 0.9T \quad \text{Formula (2)}$$

$$2 \text{ μm} \leq T-t \leq 11 \text{ μm} \quad \text{Formula (3)}$$

FIG. 1 shows a graph of Formulas (1) and (2) drawn on the coordinate plane where the horizontal axis reflects the total thickness T (μm) of the permeation layer of the triacetyl cellulose substrate and the hard coat layer and the vertical axis reflects the thickness t (μm) of the permeation layer.

In the antistatic hard coat film of the claimed invention, namely, the total thickness (T) of the hard coat layer and the permeation layer and the thickness (t) of the permeation layer need to be located in the shaded region formed by the straight lines of the respective Formulas (1) and (2) in FIG. 1.

In the case that the values (T) and (t) are located outside of the region formed by the straight lines (1) and (2), more specifically, in the case that (T) is smaller than 3 μm, (region S1 in FIG. 1), the Gloss-linked curing shrinkage of the composition for producing a hard coat layer which will be described later is interfered by the components of the triacetyl cellulose substrate. Accordingly, the cross-linking density is less likely to rise, resulting in insufficient hardness of the hard coat layer. Conversely, in the case that (T) is greater than 18 μm (region S2 in FIG. 1), the composition for producing a hard coat layer which will be described later has high closs-linked curing shrinkage. As a result, the antistatic hard coat film of the claimed invention has cracks and curls.

In the case that (t) is smaller than 0.3 T, (region S3 of FIG. 1), the hard coat layer contains many (meth)acrylate monomers, whereby the bleed out of the antistatic agent that will be described later is blocked. As a result, the antistatic hard coat film of the claimed invention has insufficient antistatic properties. Also, an interface appears between the hard coat layer and the triacetyl cellulose substrate, resulting in insufficient inhibition of an interference fringe pattern that is caused because of different refractive indexes between the hard coat layer and the triacetyl cellulose substrate. In addition, the antistatic hard coat film of the claimed invention is at high risk of having a reduced light transmittance, and also has the problems of cracks and curls. In the case that (t) is more than 0.9 T (region S4 in FIG. 1), the triacetyl cellulose substrate is swollen by the solvent, which generates fine irregularities on the surface of the triacetyl cellulose substrate. As a result, the antistatic hard coat film of the claimed invention has inferior white muddiness resistance, and the hard coat layer has insufficient hardness.

The (meth)acrylate monomer included in the permeation layer is a monomer included in the composition for producing a hard coat layer that is used for the formation of the hard coat layer which will be described later.

The permeation layer is formed as follows: when the composition for producing a hard coat layer is applied on a triacetyl cellulose substrate, the (meth)acrylate monomer permeates into the triacetyl cellulose substrate; then, the permeated (meth)acrylate monomer is cured to form the permeation layer.

In other words, the permeation layer is a layer in which the cured (meth)acrylate monomer and the materials of the triacetyl cellulose substrate are mixed.

The antistatic hard coat film of the claimed invention has the mentioned permeation layer with a thickness of preferably 2 to 8 μm. If the thickness is less than 2 μm, the antistatic hard coat film of the claimed invention may have insufficient antistatic properties. In addition, an interference fringe pattern may appear on the interface between the triacetyl cellulose substrate and the hard coat layer. On the other hand, if the thickness is more than 8 μm, the antistatic hard coat film of the claimed invention may have insufficient white muddiness resistance. The lower limit of the thickness of the permeation layer is more preferably 4 μm, and the upper limit thereof is more preferably 5 μm. If the lower and upper limit of the thickness of the permeation layer is within the above range, the antistatic hard coat film of the claimed invention satisfying Formulas (1) and (2) is extremely excellent in the white muddiness resistance and antistatic properties. In addition, the occurrence of an interference fringe pattern is also appropriately inhibited.

The thickness of the permeation layer is, for example, measured by observing a section of the antistatic hard coat film of the claimed invention using a scanning electron microscope (SEM) or the like.

Specifically, the antistatic hard coat film of the claimed invention is firstly embedded in a thermosetting resin, and then an extremely thin slice is prepared using a microtome. The extremely thin slice is dyed in $OsO_4$ (osmium oxide) for a couple of minutes, and then carbon is deposited thereon to produce a sample for measurement of the permeation layer.

The sample is measured using a scanning electron microscope (SEM) under the conditions of, for example, accelerating voltage: 30 kV, emission current: 10 μA, and magnification: 50 k, whereby the thickness of the permeation layer is determined.

The hard coat layer is formed on the triacetyl cellulose substrate and gives antistatic properties and hard coating properties to the antistatic hard coat film of the claimed invention.

The hard coat layer is formed, for example, by applying a composition for producing a hard coat layer that contains an antistatic agent, a (meth)acrylate resin, and a (meth)acrylate monomer on the triacetyl cellulose substrate to form a film, and curing the film.

The antistatic hard coat film of the claimed invention satisfies Formula (3).

In Formula (3), "T−t" denotes the thickness (μm) of the hard coat layer. If T−t is less than 2 the hard coat layer does not have sufficient hardness. On the other hand, if T−t is more than 11 μm, the antistatic hard coat film of the claimed invention curls up. The lower limit of T−t is preferably 3 and the upper limit is preferably 9 μm.

The antistatic agent is a material giving antistatic properties to the hard coat layer. The antistatic agent bleeds out on the opposite surface of the triacetyl cellulose substrate side of the hard coat layer, so that the antistatic properties are given to the hard coat layer.

In the case that the permeation layer has a small thickness, many (meth)acrylic monomers remain in the hard coat layer. Accordingly, the antistatic agent is less likely to bleed out on the surface of the hard coat layer, resulting in reduced antistatic properties. In contrast, in the case that the permeation layer has a large thickness, not many of the (meth)acrylic monomers remain in the hard coat layer. Accordingly, the antistatic agent is more likely to bleed out on the surface of the hard coat layer, resulting in improved antistatic properties.

The antistatic agent preferably includes a quaternary ammonium salt oligomer. If the antistatic agent contains a quaternary ammonium salt oligomer, the hard coat layer is given particularly appropriate antistatic properties.

The quaternary ammonium salt oligomer preferably has a weight-average molecular weight of 1,000 to 50,000. If the weight-average molecular weight is less than 1,000, the antistatic agent itself may permeate into the triacetyl cellulose substrate, whereby the antistatic agent is included in the permeation layer. As a result, the antistatic hard coat film of the claimed invention may have insufficient antistatic properties. If the weight-average molecular weight is more than 50,000, the composition for producing a hard coat layer has a high viscosity, whereby the coatability is reduced. As a result, the production efficiency of the antistatic hard coat film of the claimed invention may decrease. The lower limit of the weight-average molecular weight is more preferably 1,500, and the upper limit thereof is more preferably 30,000.

The weight-average molecular weight of the quaternary ammonium salt oligomer can be determined by gel permeation chromatography (GPC) using a polystyrene standard. A solvent such as tetrahydrofuran or chloroform may be suitably used for a GPC mobile phase. The measurement may be performed by combination use of a tetrahydrofuran column and a chloroform column, both being commercially available. Examples of the commercial columns include Shodex GPC KF-801, GPC KF-802, GPC KF-803, GPC KF-804, GPC KF-805, and GPC KF-800D (trade names, produced by Showadenkosya Co., Ltd.). For detection, a RI (differential refractive index) detector and a UV detector may be used. With the use of the solvent, columns, and detectors, the weight-average molecular weight is appropriately measured on a GPC system such as Shodex GPC-101 (Showadenkosya Co., Ltd.).

The quaternary ammonium salt oligomer is preferably a photoreactive unsaturated bond-containing compound. If a photoreactive unsaturated bond is included, the resulting hard coat layer has high hardness. Examples of the photoreactive unsaturated bond-containing compound include a (meth)acrylate-containing compound. The photoreactive unsaturated bond-containing compound inhibits bleed out, and thus improves light resistance and saponification resistance.

The quaternary ammonium salt oligomer may be a commercial product.

Examples of the commercial product thereof include H6100, H6100M, and H6500 (trade names, Mitsubishi Chemical Corporation); Uniresin AS-10/M, Uniresin AS-12/M, Uniresin AS-15/M, and Uniresin ASH26 (trade names, Shin-Nakamura Chemical Co., Ltd.); and UV-ASHC-01 (trade name, Nippon Kasei Chemical Co., Ltd.).

The composition for producing a hard coat layer preferably contains the quaternary ammonium salt oligomer in an amount of 1 to 20 mass % of the total solids content. If the amount is less than 1 mass %, the resulting hard coat layer may not have desired antistatic properties. If the amount is more than 20 mass %, the antistatic hard coat film of the claimed invention may have reduced white muddiness resistance, reduced hardness, and the like. In addition, it is not preferred in terms of cost. The lower limit of the quaternary ammonium salt oligomer content is more preferably 1 mass %, and the upper limit thereof is more preferably 10 mass %.

The (meth)acrylate monomer is, as mentioned above, a material which permeates into the triacetyl cellulose substrate to form the permeation layer.

The (meth)acrylate monomer is, for example, preferably at least one selected from the group consisting of pentaerythritol tri(meth)acrylate, dipentaerythritol hexa(meth)acrylate, pentaerythritol tetra(meth)acrylate, dipentaerythritolpenta (meth)acrylate, trimethylolpropane tri(meth)acrylate, dipentaerythritol tetra(meth)acrylate, and isocyanuric acid EO-modified tri(meth)acrylate. More preferable among these are pentaerythritol tri(meth)acrylate, dipentaerythritol hexa(meth)acrylate, and isocyanuric acid EO-modified tri(meth) acrylate.

The "(meth)acrylate monomer" herein forms the hard coat layer as well as the permeation layer, and improves the hardness of the hard coat layer and the adhesiveness to a triacetyl cellulose substrate as well.

The term "monomer" herein refers to a compound with a weight-average molecular weight of less than 1,000. Since the (meth)acrylic monomer has a weight-average molecular weight of less than 1,000, it tends to easily permeate into a triacetyl cellulose substrate.

The weight-average molecular weight can be determined in the same manner as in the case of the determination of the weight-average molecular weight of the quaternary ammonium salt oligomer mentioned above.

The (meth)acrylate resin is an oligomer or a polymer that is a polymer or a copolymer of the above mentioned (meth)acrylate monomer- or reactive functional group-containing compound, and has a weight-average molecular weight of not less than 1,000.

Examples of the (meth)acrylate resin include (meth)acrylate compounds such as an epoxy(meth)acrylate, an urethane (meth)acrylate, a polyester(meth)acrylate, a polybutadiene (meth)acrylate, and a silicone(meth)acrylate. Preferable among these is an urethane(meth)acrylate in terms of giving appropriate hardness to the hard coat layer of the antistatic hard coat film of the claimed invention. Two or more of these (meth)acrylate resins may be used in combination, and the one containing a reactive functional group is preferred.

The (meth)acrylate resin may be a commercial product. Examples of the commercial product thereof include the products under the brand name "Shikoh" of the Nippon Synthetic Chemical Industry Co., Ltd., including UV1700B, UV6300B, UV765B, UV7640B, and UV7600B; the products under the brand name "Art Resin" of Negami Chemical Industrial Co., Ltd., including Art Resin HDP, Art Resin UN3320HSBA, Art Resin UN9000H, Art Resin UN3320HA, Art Resin UN3320HB, Art Resin UN3320HC, Art Resin UN3320HS, Art Resin UN901M, Art Resin UN902MS, and Art Resin UN903; the products of Shin-Nakamura Chemical Co., Ltd., including UA100H, U4H, U4HA, U6H, U6HA, U15HA, UA32P, U6LPA, U324A, and U9HAMI; the products under the brand name "Ebecryl" of DAICEL-CYTEC Co., Ltd., including 1290, 5129, 254, 264, 265, 1259, 1264, 4866, 9260, 8210, 204, 205, 6602, 220, and 4450; the products under the brand name "Beam Set" of Arakawa Chemical Industries, Ltd., including 371 and 577; the products under the brand name "RQ" of Mitsubishi Rayon Co., Ltd.; the products under the brand name "Unidic" and the like of DIC Corporation; DPHA40H (Nippon Kayaku Co., Ltd.); and CN9006 and CN968 of Sartomer Co., Ltd. Preferable among these are UV1700B (The Nippon Synthetic Chemical Industry Co., Ltd.), DPHA40H (Nippon Kayaku Co., Ltd.), Art Resin HDP (Negami Chemical Industrial Co., Ltd.), Beam Set 371 (Arakawa Chemical Industries, Ltd.), Beam Set 577 (Arakawa Chemical Industries, Ltd.), and U15HA (Shin-Nakamura Chemical Co., Ltd.).

The blending ratio (monomer/resin) of the (meth)acrylate monomer to the (meth)acrylate resin in the composition for producing a hard coat layer is preferably 40/60 to 95/5 by the mass ratio. If the ratio is less than 40/60, the proportion of the (meth)acrylate resin is too large. Accordingly, the resulting antistatic hard coat film of the claimed invention becomes too thin (region S3 in FIG. 1), whereby an interface appears between the hard coat layer and the triacetyl cellulose substrate. As a result, an interference fringe pattern may appear because of the different refractive indexes therebetween, and the adhesiveness therebetween may be reduced. If the ratio is more than 95/5, the proportion of the (meth) acrylate monomer is too large. Thereby, although the adhesiveness between the triacetyl cellulose substrate and the hard coat layer is improved, the triacetyl cellulose substrate is swollen by the solvent to generate fine irregularities on the surface of the triacetyl cellulose substrate. As a result, permeation layer becomes too thick (region S4 in FIG. 1) and bleached. In addition, if the proportion of the (meth) acrylate monomer is too large, heat is generated when the film formed from the composition for producing a hard coat layer is cured to form a hard coat layer. Thereby, the triacetyl cellulose substrate may have wrinkles. The blending ratio (monomer/resin) is more preferably 55/45 to 95/5 by the mass ratio.

The composition for producing a hard coat layer preferably further contains a permeable solvent.

The permeable solvent refers to a solvent which gives wettability and swelling property to the substrate on which a composition containing the solvent is applied, and a solvent which helps a composition containing the solvent to permeate into a substrate as the solvent itself permeates into the substrate.

Use of the permeable solvent enables to form the permeation layer formed on the triacetyl cellulose substrate efficiently and surely.

Examples of the permeable solvent include ketones such as acetone, methyl ethyl ketone, cyclohexanone, and diacetone alcohol; esters such as methyl formate, methyl acetate, and ethyl acetate; nitrogen-containing compounds such as nitromethane, acetonitrile, N-methylpyrrolidone, and N,N-dimethyl formamide; ethers such as tetrahydrofuran, 1,4-dioxane, dioxolan, and diisopropylether; halogenated hydrocarbons such as methylene chloride, chloroform, and tetrachloroethane; glycol ethers such as methyl cellosolve, ethyl cellosolve, butyl cellosolve, and cellosolve acetate; dimethyl sulfoxide; and propylene carbonate. Mixtures of these are also acceptable. Preferable among these is at least one selected from the group consisting of methyl acetate, ethyl acetate, and methyl ethyl ketone, and methyl ethyl ketone is particularly preferable.

Preferably, the composition for producing a hard coat layer further contains a nonpermeable solvent in addition to the permeable solvent. If only the permeable solvent is used as the solvent of the composition for producing a hard coat layer, the composition has extreme difficulty in producing a hard coat layer with excellent white muddiness resistance. In contrast, if a nonpermeable solvent is used in combination with the permeable solvent, the thickness of the permeation layer is easily controlled, leading to efficient production of a hard coat layer with excellent white muddiness resistance.

The nonpermeable solvent refers to a solvent that does not permeate into the substrate on which a composition including the solvent is applied.

Specific examples of the nonpermeable solvent include at least one selected from the group consisting of methyl isobutyl ketone, isopropyl acetate, butyl acetate, ethyl lactate, isopropyl alcohol, N-butanol, methyl glycol, methyl glycol acetate, and diethyl ketone. Among these, isopropyl acetate is suitably used.

Methyl isobutyl ketone is sometimes categorized into a permeable solvent. However, it is herein categorized into a "nonpermeable solvent" because it has lower permeation ability into a substrate and is less likely to exert swelling property, compared with the above mentioned permeable solvent.

The blending ratio of the nonpermeable solvent to the permeable solvent in the composition for producing a hard coat layer is preferably 5 to 40 parts by mass of the nonpermeable solvent relative to 100 parts by mass of the permeable solvent. If the amount of the nonpermeable solvent is less than 5 parts by mass, the resulting permeation layer becomes too thick (region S4 in FIG. 1), possibly resulting in insufficient white muddiness resistance. If the amount thereof is more than 40 parts by mass, the resulting permeating layer becomes too thin (region S3 in FIG. 1), the adhesiveness between the hard coat layer and the triacetyl cellulose substrate is reduced and too many (meth)acrylate monomers remain in the hard coat layer. Thereby, the bleed out of the antistatic agent is blocked, possibly resulting in insufficient antistatic properties. Furthermore, an interference fringe pattern may appear on the interface between the triacetyl cellulose substrate and the hard coat layer.

The lower limit of the amount of the nonpermeable solvent is more preferably 10 parts by mass, and the upper limit is more preferably 20 parts by mass. If the blending ratio of the nonpermeable solvent to the permeable solvent is within the above range, a permeation layer having an appropriate thickness can be formed. Thereby, a hard coat layer extremely excellent in the white muddiness resistance and the antistatic properties is efficiently produced.

The composition for producing a hard coat layer preferably has a solid concentration of 20 to 60 mass %. If the solid concentration is less than 20 mass %, the resulting hard coat layer may have insufficient hardness. If the solid concentration is more than 60 mass %, highly efficient production of the hard coat layer may not be possible. The lower limit of the solid concentration is more preferably 30 mass %, and the upper limit thereof is more preferably 50 mass %. The solid concentration within this range enables highly efficient production of the hard coat layer with sufficient hardness and mentioned effects.

The composition for producing a hard coat layer may optionally contain additional materials to the extent that does not affect the effects of the claimed invention.

Examples of the additional materials include a photopolymerization initiator, a leveling agent, a crosslinking agent, a curing agent, a polymerization accelerator, a viscosity modifier, and resins not mentioned above.

Examples of the photopolymerization initiator include acetophenones (e.g. 1-hydroxy-cyclohexyl-phenyl-ketone under the trade name of Irgacure 184, produced by BASF; and 2-methyl-1[4-(methylthio)phenyl]-2-moriforino propane-1-on under the trade name of Irgacure 907, produced by BASF), benzophenones, thioxanthones, benzoin, benzoin methyl ethers, aromatic diazonium salts, aromatic sulfonium salts, aromatic iodonium salts, metallocene compounds, and benzoin sulfonate. Each of these may be used alone, or two or more of these may be used in combination.

The amount of the photopolymerization initiator is preferably 0.1 to 10 parts by mass relative to 100 parts by mass of the resin solids content of the composition for producing a hard coat layer.

Any known products of the leveling agent, crosslinking agent, curing agent, polymerization accelerator, viscosity modifier, and resins not mentioned above may be used.

The composition for producing a hard coat layer may optionally contain known additives such as an antiglare agent, a low refractive index agent, a middle refractive index agent, and an antifouling agent to the extent that does not affect the effects of the claimed invention.

The method for preparing the composition for producing a hard coat layer is, for example, a method of mixing and dispersing the antistatic agent, (meth)acrylate resin, (meth)acrylate monomer, permeable solvent, nonpermeable solvent, and additional materials.

These materials may be mixed and dispersed with any known method such as a paint shaker or a bead mill.

The composition for producing a hard coat layer may be applied on a triacetyl cellulose substrate by any applying method such as a roll coating method, a Meyer bar coating method, a gravure coating method, or a die coating method.

The amount of the composition for producing a hard coat layer applied thereon may be appropriately adjusted such that the resulting hard coat layer has the predetermined thickness shown below.

The application speed of the composition for producing a hard coat layer is not particularly limited, and is preferably 10 m/min or faster. The required application speed can be accomplished, for example, by using the hard coat layer composition including the permeable solvent and the nonpermeable solvent in combination. Particularly, the above speed can be suitably accomplished if methyl ethyl ketone is used as the permeable solvent and isopropyl acetate, methyl isobutyl ketone, or isopropyl alcohol is used as the nonpermeable solvent.

In order to cure the film formed from the composition for producing a hard coat layer, which is applied on the triacetyl cellulose substrate, for example, the film may be irradiated with active energy rays.

The required thickness of the permeable layer can be accomplished by, prior to the irradiation of the active energy rays, drying the film under the below conditions within 20 seconds from completion of the application of the film. If the film is dried more than 20 seconds from completion of the application, the composition for producing a hard coat layer permeates too much.

Drying temperature: 40 to 80° C.
Drying time: 20 to 70 seconds
Wind velocity: 5 to 20 m/min If the drying temperature is lower than 40° C., the composition for producing a hard coat layer permeates into the triacetyl cellulose substrate too much. On the other hand, if the drying temperature is higher than 80° C., the composition for producing a hard coat layer does not permeate into the triacetyl cellulose substrate sufficiently. A drying temperature within the above range enables a permeation layer to have a stable thickness and to be prevented from an uneven thickness.

The method for producing an antistatic hard coat film including a drying step under the above conditions is also one aspect of the claimed invention.

Examples of the irradiation of the active energy rays include irradiation of ultraviolet rays and irradiation of an electron beam. Specific examples of the light source of the ultraviolet rays include light sources such as an ultrahigh pressure mercury lamp, a high pressure mercury lamp, a low pressure mercury lamp, a carbon arc lamp, a black light fluorescent lamp, and a metal halide lamp. The wavelength of the ultraviolet rays may be in the range of 190 to 380 nm.

Specific examples of the light source of the electron beam include various types of electron beam accelerators such as Cockcroft-Walton type, Van de Graaff type, resonance transformer type, insulated core transformer type, linear type, dynamitron type, and high frequency type.

Preferable among these is a high pressure mercury lamp, because the thickness of the permeation layer can be adjusted as desired depending on the wavelength range.

Thus formed antistatic hard coat film of the claimed invention is appropriately adjusted to have a hard coat layer with a layer thickness satisfying the relationship represented by Formulas (1) and (2) with the thickness of the permeation layer.

The layer thickness of the hard coat layer may be determined, for example, by calculating the mean value of the differences between the thickness from the surface of the triacetyl cellulose substrate not having the hard coat layer to the top surface of the hard coat layer and the thickness of the triacetyl cellulose substrate at any ten points. Each thickness is measured by observing the corresponding section of the antistatic hard coat film of the claimed invention with an electron microscope (SEM, TEM, STEM).

The antistatic hard coat film of the claimed invention contains the hard coat layer formed on the triacetyl cellulose substrate, and may further contain optional layers such as a low refractive index layer, an antiglare layer, a high refractive index layer, a middle refractive index layer, and an antifouling layer according to need.

The above low refractive index layer, antiglare layer, high refractive index layer, middle refractive index layer, and antifouling layer may be individually formed according to a known method by preparing a composition that includes a common additive such as a low refractive index agent, an antiglare agent, a high refractive index agent, a middle refractive index agent, an antifouling agent, or a resin.

The antistatic hard coat film of the claimed invention preferably has a surface resistivity of $1\times10^{11} \Omega/\square$ or less. If the surface resistivity is more than $1\times10^{11}\Omega/\square$, the adhesion of dust may not be prevented. The surface resistivity is more preferably $1\times10^{10}\Omega/\square$ or less, and further preferably $1\times10^{9}\Omega/\square$ or less.

The antistatic hard coat film of the claimed invention preferably has a total light transmittance of 90% or more. If the total light transmittance is less than 90%, the color reproducibility and the visibility may be deteriorated when the antistatic hard coat film of the claimed invention is mounted on the surface of an image display device. The total light transmittance is more preferably 91% or more, and further preferably 92% or more.

The antistatic hard coat film of the claimed invention preferably has a haze of less than 1%, and more preferably less than 0.5%. Such a low haze value can be accomplished by forming a hard coat layer and a permeation layer that satisfy Formulas (1) and (2) using the composition for a hard coat layer.

The antistatic hard coat film of the claimed invention preferably has a hardness of 2 H or more, and more preferably 3 H or more, as determined in the hardness test (load: 4.9 N) of JIS K5400. Additionally, in the Taber test according to JIS K5400, a test piece of the antistatic hard coat film preferably has less abrasive wear after the test.

The antistatic hard coat film of the claimed invention may be produced into a polarizer by forming a polarizing element on the opposite side of the hard coat layer side of the antistatic hard coat film of the claimed invention. Such a polarizer is also another aspect of the claimed invention.

The polarizing element is not particularly limited, and examples thereof include a polyvinyl alcohol film, a polyvinyl formal film, a polyvinyl acetal film, and a saponified ethylene-vinyl acetate copolymer film, which are individually prepared by dying the films with iodine and the like and stretching the dyed films.

Upon the lamination of the polarizing element and the antistatic hard coat film of the claimed invention, the triacetyl cellulose substrate is preferably subjected to saponification. The saponification improves adhesion and thereby antistatic effects are also achieved.

Another aspect of the claimed invention is an image display device that is produced by forming the antistatic hard coat film or the polarizer on an outermost surface of the image display device. The type of the image display device may be an LCD, a PDP, an FED, an ELD (organic EL, inorganic EL), a CRT, a touch panel, an electronic paper display, a tablet computer, or the like.

An LCD, a representative example of the above, contains a transmission display and a light source device that irradiates the transmission display from the back. If the image display device of the claimed invention is an LCD, it contains the antistatic hard coat film of the claimed invention or the polarizer of the claimed invention on the surface of the transmission display. It also contains the antistatic hard coat film on the front plate (glass substrate or film substrate).

In the case that the claimed invention is a liquid crystal display device containing the antistatic hard coat film, light from a light source device is irradiated from the down side of the antistatic hard coat film. In the case of a STN liquid crystal display device, a phase plate may be inserted between the liquid crystal display device and the polarizer. Such a liquid crystal display device may optionally have an adhesive layer between the respective layers.

A PDP, exemplified as the above image display device, contains a surface glass substrate (an electrode is formed on the surface), a back glass substrate (an electrode and a fine drain are formed on the surface, and a red, green, and blue phosphor layers are formed in the drain) that faces the surface glass substrate, and discharge gas sealed between the two substrates. In the case that the image display device of the claimed invention is a PDP, the PDP contains the antistatic hard coat film on the surface of the surface glass substrate or on the front plate (glass substrate or film substrate) of the surface glass substrate.

The types of the image display device may be: an ELD device in which a light emitter (e.g. zinc sulfide, a diamine) that emits light when voltage is applied is deposited on a glass substrate and an image is displayed by controlling the voltage applied to the substrate; or a CRT in which electrical signals are converted into light to generate an image visible to the human eye. In these cases, the display device contains the antistatic hard coat film on the outermost surface or on the surface of the front plate of the display device.

Any image display device of the claimed invention may be used as a display of a television, a computer, and the like. Particularly, the image display device of the claimed invention can be appropriately used for the surface of a display for high definition images such as a CRT, a liquid crystal panel, a PDP, an ELD, an FED, a touch panel, an electronic paper display, a tablet computer, and the like.

Advantageous Effects of Invention

The antistatic hard coat film of the claimed invention contains a triacetyl cellulose substrate and a hard coat layer formed on the triacetyl cellulose substrate, and a permeation layer that satisfies both of Formulas (1) and (2) is formed from the hard coat layer side of the interface of the triacetyl cellulose substrate to the inner region. Accordingly, the white muddiness resistance and the antistatic properties can be achieved at extremely high levels. Having such a permeation layer, the antistatic hard coat film of the claimed invention can appropriately inhibit an interference fringe pattern on the interface between the triacetyl cellulose substrate and the hard coat layer.

Moreover, in the case that a permeable solvent and a nonpermeable solvent are used in combination as the solvent of the composition for producing a hard coat layer to form the hard coat layer, the solid concentration of the composition for producing a hard coat layer is lower than conventional ones. Thus, the hard coat layer can be formed with higher efficiency compared to conventional cases.

Therefore, the antistatic hard coat film of the claimed invention can be appropriately applied for cathode ray tube displays (CRT), liquid crystal displays (LCD), plasma display panels (PDP), electroluminescence displays (ELD), field emission displays (FED), touch panels, electronic paper displays, tablet computers, and the like.

BRIEF DESCRIPTION OF DRAWINGS

FIG. 1 shows a graph of Formulas (1) and (2) drawn on the coordinate plane where the horizontal axis reflects the total thickness (T) of the permeation layer and the hard coat layer of the triacetyl cellulose substrate of the antistatic hard coat film of the claimed invention and the vertical axis reflects the thickness (t) of the permeation layer.

DESCRIPTION OF EMBODIMENTS

The claimed invention will be described with reference to the examples below. However, the below embodiments do not limit the interpretation of the claimed invention. Unless specifically stated otherwise, "part" and "%" are described based on mass. The amount of each material is shown in solid content, unless specifically stated otherwise.

Example 1

The materials shown below were mixed to prepare a composition for producing a hard coat layer.
Antistatic agent (UV-ASHC-01, Nippon Kasei Chemical Co., Ltd., weight-average molecular weight: 10,000, solids content: 50%, quaternary ammonium salt content: about 15% in the solids content, about 90% of the antistatic agent is composed of DPHA, solvent MEK, and alcohol): 3 parts by mass
Dipentaerythritolhexaacrylate (DPHA, Nippon Kayaku Co., Ltd.): 87 parts by mass
Urethane acrylate (UV1700B, the Nippon Synthetic Chemical Industry Co., Ltd., number of functional groups: 10, weight-average molecular weight: 2,000): 10 parts by mass
Irgacure 184 (BASF): 4 parts by mass
MEK (methyl ethyl ketone): 88 parts by mass
IPAC (isopropyl acetate): 12 parts by mass Next, a triacetyl cellulose substrate with a thickness of 80 µm (Fujifilm Corporation, TD80UL) was prepared. The obtained composition for producing a hard coat layer was applied on one surface of the triacetyl cellulose substrate to form a coating. After 8 seconds after the formation of the coating, the film was dried in a heat oven at a temperature of 50° C. and a wind velocity of 10 m/min for 60 seconds to evaporate the solvent in the coating. The coating was then irradiated with ultraviolet rays such that the accumulated light amount was 50 mJ to cure the coating. Thereby, an antistatic hard coat film was produced.

Examples 2 to 10, Comparative Examples 1 to 14

An antistatic hard coat film was produced in the same manner as in Example 1 except that the materials and the blending amount thereof were changed according to Table 1. The ingredients of the materials shown in Table 1 are as follows.
M-8030: polyfunctional polyester acrylate
MT3506: polyfunctional polyester acrylate, Toagosei Co., Ltd.
BS577: urethane acrylate, Arakawa Chemical Industries, Ltd., number of functional groups: 6, weight-average molecular weight: 1,000 (PETA occupies 60% of the solids content)
IPA: isopropyl alcohol
n-BuOH: n-butanol
MIBK: methyl isobutyl ketone Example 11

A triacetyl cellulose substrate with a thickness of 80 µm (Fujifilm Corporation, TD80UL) was prepared. The composition for producing a hard coat layer having the formulation shown in Table 1 was applied on one surface of the triacetyl cellulose substrate to form a coating.

After 8 seconds after the formation of the coating, the film was dried in a heat oven at a temperature of 70° C. and a wind velocity of 10 m/min for 60 seconds to evaporate the solvent in the coating. Then, the coating was irradiated with ultraviolet rays such that the accumulated light amount was 50 mJ to cure the coating. Thereby, an antistatic hard coat film was produced.

The obtained antistatic hard coat films were evaluated by the following methods. Table 1 shows the results.
(Evaluation 1: Surface Resistivity)
The surface resistivity ($\Omega/\square$) of each film was measured with an applied voltage of 500 V using a surface resistivity meter (Mitsubishi Chemical Corporation, product number: Hiresta IP MCP-HT260).
(Evaluation 2: Occurrence of White Muddiness)
Occurrence of white muddiness was evaluated for each film by irradiating light from the opposite side of the hard coat layer side of each antistatic hard coat film and visually observing the occurrence of white muddiness from the hard coat layer side by the transmitted light. The antistatic hard coat film was evaluated as "good" when it had no white muddiness and was in good state; and was evaluated as "poor" when it had white muddiness.
(Evaluation 3: Occurrence of Interference Fringe Pattern)
A black tape was attached on the opposite side of the hard coat layer side of each antistatic hard coat film to prevent back reflection. The antistatic hard coat film was visually observed from the hard coat layer side, to evaluate the occurrence of an interference fringe pattern. The antistatic hard coat film was evaluated as "good" when it had no interference fringe pattern and was in good state; and was evaluated as "poor" when it had an interference fringe pattern.
(Evaluation 4: Thickness (t) of Permeation Layer)
Each antistatic hard coat film was cut in the thickness direction and the cut section was observed with a scanning electron microscope (SEM) to measure the thickness (t) of the permeation layer.
In addition, the total thickness T (µm) of the hard coat layer and the permeation layer was also measured.

Specifically, the antistatic hard coat film was embedded in a thermosetting resin and then an extremely thin slice was prepared with a microtome. The extremely thin slice was dyed in $OsO_4$ (osmium oxide) for a couple of minutes, and then carbon was deposited thereon to produce a sample for measurement of the permeation layer.

The sample was measured using a scanning electron microscope (SEM) under the conditions of accelerating voltage: 30 kV, emission current: 10 μA, and magnification: 50 k, to determine the thickness of the permeation layer.

(Evaluation 5: Pencil Hardness Test)

After each antistatic hard coat film was conditioned at a temperature of 25° C. and a relative humidity of 60% for 2 hours, the test was performed at a load of 4.9 N using test pencils specified by JIS-S-6006 (hardness: H to 3 H) according to the pencil hardness evaluation method prescribed in JIS K5600-5-4 (1999). A hardness of 2 H or more was evaluated as good.

(Evaluation 6: Total Light Transmittance)

The total light transmittance (%) was measured for each film using a haze meter (Murakami Color Research Laboratory Co., Ltd., product number: HM-150) according to JIS K-7361.

(Evaluation 7: Haze)

The haze value (%) was measured for each film using a haze meter (Murakami Color Research Laboratory Co., Ltd., product number: HM-150) according to JIS K-7136.

(Evaluation 8: Curl)

Each antistatic hard coat film was cut into a size of 100 mm×100 mm to prepare a sample. Each sample was placed on a horizontal table with the hard coat layer side up, and its curled corners were observed. The average value of the heights from the table to the respective corners was calculated. The evaluation was carried out according to the following criteria: The height of the curled corner was lower than 40 mm: good The height of the curled corner was 40 mm or higher: poor

[Table 1]

| | Antistatic agent (parts by mass) | Resin (parts by mass) | Initiator (parts by mass) | Permeable solvent (parts by mass) | Nonpermeable solvent (parts by mass) | | | | Total thickness of the film (μm) | Thickness of hard coat layer (μm) |
|---|---|---|---|---|---|---|---|---|---|---|
| Example 1 | UV-ASHC-01 3 | DPHA 87 | UV17OOB 10 | Irgacure 184 4 | MEK 88 | IPAC 12 | | | | 10 | 6 |
| Example 2 | UV-ASHC-01 3 | DPHA 87 | UV17OOB 10 | Irgacure 184 4 | MEK 80 | IPAC 20 | | | | 10 | 7 |
| Example 3 | UV-ASHC-01 3 | DPHA 87 | UV17OOB 10 | Irgacure 184 4 | MEK 90 | IPAC 10 | | | | 10 | 3 |
| Example 4 | UV-ASHC-01 3 | DPHA 87 | UV17OOB 10 | Irgacure 184 4 | MEK 88 | IPAC 12 | | | | 6 | 4 |
| Example 5 | UV-ASHC-01 3 | DPHA 87 | UV17OOB 10 | Irgaoure 184 4 | MEK 86 | Butyl acetate 12 | | | | 15 | 9 |
| Example 6 | UV-ASHC-01 3 | DPHA 87 | BS577 10 | Irgacure 184 4 | MEK 88 | IPAC 12 | | | | 10 | 6 |
| Example 7 | UV-ASHC-01 3 | DPHA 87 | UV17OOB 10 | Irgacure 184 4 | MEK 82 | IPAC 7 | IPA 3 | n-BuOH 8 | | 10 | 6 |
| Example 8 | UV-ASHC-01 4 | DPHA 87 | BS577 10 | Irgacure 184 4 | Methyl acetate 88 | IPAC 12 | | | | 10 | 6 |
| Example 9 | UV-ASHC-01 3 | M-8030 87 | UV17OOB 10 | Irgacure 184 4 | MEK 88 | Diethyl ketone 12 | | | | 10 | 6 |
| Example 10 | UV-ASHC-01 3 | M-9050 87 | UV17OOB 10 | Irgacure 184 4 | Cyclohexanone 88 | IPAC 12 | | | | 10 | 6 |
| Example 11 | UV-ASHC-01 3 | DPHA 87 | UV17OOB 10 | Irgacure 184 4 | Acetone 88 | IPAC 12 | | | | 10 | 6 |
| Comparative Example 1 | UV-ASHC-01 3 | DPHA 87 | UV17OOB 10 | Irgacure 184 4 | MEK 98 | IPAC 2 | | | | 10 | 0.5 |
| Comparative Example 2 | UV-ASHC-01 3 | DPHA 87 | UV17OOB 10 | Irgacure 184 4 | MEK 98 | MIBK 2 | | | | 10 | 0.5 |
| Comparative Example 3 | UV-ASHC-01 3 | DPHA 87 | BS577 10 | Irgacure 184 4 | MEK 98 | MIBK 2 | | | | 10 | 0.5 |
| Comparative Example 4 | UV-ASHC-01 3 | DPHA 87 | UV17OOB 10 | Irgacure 184 4 | MEK 30 | IPAC 70 | | | | 10 | 9 |
| Comparative Example 5 | UV-ASHC-01 3 | DPHA 87 | UV17OOB 10 | Irgacure 184 4 | MEK 0 | IPAC 100 | | | | 10 | 9 |
| Comparative Example 6 | UV-ASHC-01 3 | DPHA 87 | UV17OOB 10 | Irgacure 184 4 | MEK 30 | Diethyl ketone 70 | | | | 10 | 9 |
| Comparative Example 7 | UV-ASHC-01 0 | DPHA 88 | UV17OOB 12 | Irgacure 184 4 | MEK 88 | IPAC 12 | | | | 10 | 6 |
| Comparative Example 8 | H6500 3 | DPHA 87 | UV17OOB 10 | Irgacure 184 4 | Methyl acetate 88 | IPAC 12 | | | | 2 | 1 |
| Comparative Example 9 | UV-ASHC-01 3 | DPHA 87 | UV17OOB 10 | Irgacure 184 4 | MEK 80 | IPAC 20 | | | | 2 | 1.5 |
| Comparative Example 10 | H6500 3 | DPHA 87 | UV17OOB 10 | Irgacure 184 4 | MEK 88 | Butyl acetate 12 | | | | 19 | 12 |
| Comparative Example 11 | UV-ASHC-01 4 | DPHA 88 | UV17OOB 8 | Irgacure 184 4 | MEK 88 | IPAC 7 | IPA 3 | n-BuOH 2 | | 19 | 12 |
| Comparative Example 12 | UV-ASHC-01 3 | DPHA 35 | UV17OOB 62 | Irgacure 184 4 | MEK 88 | IPAC 12 | | | | 10 | 6 |

-continued

| | | | | | | | | |
|---|---|---|---|---|---|---|---|---|
| Comparative Example 13 | UV-ASHC-01 3 | DPHA 0 | UV17OOB 97 | Irgacure 184 4 | MEK 88 | IPAC 12 | 10 | 6 |
| Comparative Example 14 | UV-ASHC-01 3 | DPHA 97 | UV17OOB 0 | Irgacure 184 4 | MEK 88 | IPAC 12 | 10 | 6 |

| | Evaluation 1 Surface resistivity ($\Omega$/sq) | Evaluation 2 Bleaching | Evaluation 3 Interference fringe pattern | Evaluation 4 Thickness of permeation layer ($\mu$m) | Evaluation 5 Pencil hardness | Evaluation 6 Total light transmittance (%) | Evaluation 7 Haze (%) | Evaluation 8 Curl |
|---|---|---|---|---|---|---|---|---|
| Example 1 | $10^9$ | good | good | 4 | 2 H | 92 | 0.3 | good |
| Example 2 | $10^{10}$ | good | good | 3 | 2 H | 92 | 0.3 | good |
| Example 3 | $10^9$ | good | good | 7 | 2 H | 92 | 0.3 | good |
| Example 4 | $10^9$ | good | good | 2 | 2 H | 92 | 0.3 | good |
| Example 5 | $10^{10}$ | good | good | 6 | 2 H | 92 | 0.3 | good |
| Example 6 | $10^9$ | good | good | 4 | 2 H | 92 | 0.3 | good |
| Example 7 | $10^9$ | good | good | 4 | 2 H | 92 | 0.3 | good |
| Example 8 | $10^8$ | good | good | 4 | 2 H | 92 | 0.3 | good |
| Example 9 | $10^9$ | good | good | 4 | 2 H | 92 | 0.3 | good |
| Example 10 | $10^9$ | good | good | 4 | 2 H | 92 | 0.3 | good |
| Example 11 | $10^9$ | good | good | 4 | 2 H | 92 | 0.3 | good |
| Comparative Example 1 | ND | poor | good | 9.5 | 2 H | 92 | 0.5 | good |
| Comparative Example 2 | ND | poor | good | 9.5 | 2 H | 92 | 0.5 | good |
| Comparative Example 3 | ND | poor | good | 9.5 | 2 H | 92 | 0.5 | good |
| Comparative Example 4 | Over | good | poor | 1 | 2 H | 92 | 0.3 | good |
| Comparative Example 5 | Over | good | poor | 1 | 2 H | 92 | 0.3 | good |
| Comparative Example 6 | Over | good | poor | 1 | 2 H | 92 | 0.3 | good |
| Comparative Example 7 | Over | good | poor | 4 | 2 H | 92 | 0.3 | good |
| Comparative Example 8 | ND | poor | good | 1 | H | 92 | 0.5 | gcod |
| Comparative Example 9 | $10^9$ | good | good | 0.5 | H | 92 | 0.3 | good |
| Comparative Example 10 | $10^9$ | good | good | 7 | 2 H | 92 | 0.3 | poor |
| Comparative Example 11 | $10^9$ | good | good | 7 | 2 H | 92 | 0.3 | poor |
| Comparative Example 12 | $10^{12}$ | good | poor | 1 | 2 H | 92 | 0.3 | good |
| Comparative Example 13 | OVER | good | poor | 0.5 | 2 H | 92 | 0.3 | good |
| Comparative Example 14 | $10^8$ | poor | good | 9.5 | H | 92 | 0.5 | good |

ND: Below the measurement limit

As shown in Table 1, good results were obtained in all the evaluation items for the antistatic hard coat films of the examples satisfying Formula (1): 3 $\mu$m$\leq$T$\leq$18 $\mu$m; Formula (2): 0.3 T$\leq$t$\leq$0.9 T; and Formula (3): 2 $\mu$m$\leq$T−t$\leq$11 $\mu$m, wherein T denotes the total thickness ($\mu$m) of the permeation layer and the hard coat layer, and t denotes the thickness ($\mu$m) of the permeation layer.

In contrast, white muddiness was observed in the antistatic hard coat films of Comparative Examples 1 to 3 not satisfying the right-hand side of Formula (2) and the left-hand side of Formula (3). The surface resistivity was high and an interference fringe pattern was also appeared in the antistatic hard coat films of Comparative Examples 4 to 6 not satisfying the left-hand side of Formula (2) and the antistatic hard coat film of Comparative Example 7 containing no antistatic agent. The pencil hardness was poor in the antistatic hard coat films of Comparative Examples 8 and 9 not satisfying the left-hand side of Formula (1) and the left-hand side of Formula (3), and white muddiness was further observed in the antistatic hard coat film of Comparative Example 8. Large curls were observed in the antistatic hard coat films of Comparative Examples 10 and 11 not satisfying the right-hand side of Formula (1) and the right-hand side of Formula (3). An interference fringe pattern appeared in the antistatic hard coat films of Comparative Examples 12 and 13 not satisfying the left-hand side of Formula (2), and white muddiness appeared in the antistatic hard coat film of Comparative Example 14 not satisfying the right-hand side of Formula (2).

Here, when an antistatic hard coat film was produced in the same manner as in Example 1, except for changing the drying conditions of the coating formed from the composition for producing a hard coat layer to: drying temperature of 100° C., drying time of 80 seconds, and wind velocity of 30 m/min, the thickness of the permeation layer did not satisfy the left-hand side of Formula (2).

INDUSTRIAL APPLICABILITY

The antistatic hard coat film of the claimed invention contains a triacetyl cellulose substrate, a hard coat layer, and a permeation layer, each of which has the mentioned features. Therefore, the antistatic hard coat film is extremely excellent in white muddiness resistance and antistatic properties, and can sufficiently prevent an interference fringe pattern. Accordingly, the antistatic hard coat film of the claimed invention can be appropriately used for cathode ray tube displays (CRT), liquid crystal displays (LCD), plasma display panels (PDP), electroluminescence displays (ELD), field emission displays (FED), and the like.

The invention claimed is:

1. An antistatic hard coat film comprising
a triacetyl cellulose substrate, and
a hard coat layer formed on the triacetyl cellulose substrate,
wherein the hard coat layer comprises an antistatic agent, a (meth)acrylate resin, and a polymer of a (meth)acrylate monomer,
wherein the hard coat layer is a cured product of a film formed by applying a composition for producing the hard coat layer on the triacetyl cellulose substrate, the composition comprising the antistatic agent, the (meth)acrylate resin, and the (meth)acrylate monomer,
the triacetyl cellulose substrate comprises a permeation layer formed by permeation of the (meth)acrylate monomer from the hard coat layer side of an interface toward the side opposite from the hard coat layer,
the antistatic hard coat film satisfies Formulas (1), (2), and (3):

$$3 \ \mu m \leq T \leq 18 \ \mu m \quad \text{Formula (1)}$$

$$0.3T \leq t \leq 0.9T \quad \text{Formula (2)}$$

$$2 \ \mu m \leq T-t \leq 11 \ \mu m \quad \text{Formula (3)}$$

where T denotes the total thickness (μm) of the permeation layer and the hard coat layer, and t denotes the thickness (μm) of the permeation layer,
the antistatic hard coat film exhibits a haze of less than 0.5%, and
the antistatic hard coat film exhibits good white muddiness resistance
the antistatic hard coat film being prepared by drying the film under the drying conditions below, the drying of the film starting within 20 seconds from completion of the application of the composition;
the drying conditions being:
Drying temperature: 40 to 80° C.;
Drying time: 20 to 70 seconds; and
Air velocity for drying: 5 to 20 m/min.

2. The antistatic hard coat film according to claim 1, wherein the thickness of the permeation layer (t) is 2 to 8 μm.

3. The antistatic hard coat film according to claim 2, wherein the permeation layer is formed by permeation of the (meth)acrylate monomer in the composition into the triacetyl cellulose substrate.

4. The antistatic hard coat film according to claim 2, wherein the antistatic agent contains a quaternary ammonium salt oligomer.

5. The antistatic hard coat film according to claim 2, wherein the (meth)acrylate monomer has a weight-average molecular weight of less than 1,000.

6. The antistatic hard coat film according to claim 2, wherein the (meth)acrylate monomer is at least one selected from the group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, and isocyanuric acid EO-modified tri(meth)acrylate.

7. A polarizer comprising a polarizing element, wherein said polarizer has the antistatic hard coat film according to claim 2 on a surface of the polarizing element.

8. The antistatic hard coat film according to claim 1, wherein the antistatic agent contains a quaternary ammonium salt oligomer.

9. The antistatic hard coat film according to claim 8, wherein the (meth)acrylate monomer has a weight-average molecular weight of less than 1,000.

10. The antistatic hard coat film according to claim 8, wherein the (meth)acrylate monomer is at least one selected from the group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, and isocyanuric acid EO-modified tri(meth)acrylate.

11. The antistatic hard coat film according to claim 1, wherein the (meth)acrylate monomer has a weight-average molecular weight of less than 1,000.

12. The antistatic hard coat film according to claim 11, wherein the (meth)acrylate monomer is at least one selected from the group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, and isocyanuric acid EO-modified tri(meth)acrylate.

13. The antistatic hard coat film according to claim 1, wherein the (meth)acrylate monomer is at least one selected from the group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, and isocyanuric acid EO-modified tri(meth)acrylate.

14. A polarizer comprising a polarizing element, wherein said polarizer has the antistatic hard coat film according to claim 1 on a surface of the polarizing element.

15. An image display device comprising the polarizer according to claim 14 or an antistatic hard coat film comprising
a triacetyl cellulose substrate, and
a hard coat layer formed on the triacetyl cellulose substrate,
wherein the hard coat layer comprises an antistatic agent, a (meth)acrylate resin, and a polymer of a (meth)acrylate monomer,
wherein the hard coat layer is a cured product of a film formed by applying a composition for producing the hard coat layer on the triacetyl cellulose substrate, the composition comprising the antistatic agent, the (meth)acrylate resin, and the (meth)acrylate monomer,
the triacetyl cellulose substrate comprises a permeation layer formed by permeation of the (meth)acrylate monomer from the hard coat layer side of an interface toward the side opposite from the hard coat layer,
the antistatic hard coat film satisfies Formulas (1), (2), and (3):

$$3 \ \mu m \leq T \leq 18 \ \mu m \quad \text{Formula (1)}$$

$$0.3T \leq t \leq 0.9T \quad \text{Formula (2)}$$

$$2 \ \mu m \leq T-t \leq 11 \ \mu m \quad \text{Formula (3)}$$

where T denotes the total thickness (μm) of the permeation layer and the hard coat layer, and t denotes the thickness (μm) of the permeation layer on an outermost surface of the image display device, the antistatic hard coat film exhibits a haze of less than 0.5%, and the antistatic hard coat film exhibits good white muddiness resistance the antistatic hard coat film being prepared by drying the film under the drying conditions below, the drying of the film starting within 20 seconds from completion of the application of the composition;

the drying conditions being:

Drying temperature: 40 to 80° C.;

Drying time: 20 to 70 seconds; and

Air velocity for drying: 5 to 20 m/min.

* * * * *